United States Patent [19]

Suzuki et al.

[11] Patent Number: 4,852,147
[45] Date of Patent: Jul. 25, 1989

[54] TELEPHONE APPARATUS

[75] Inventors: Katsuo Suzuki; Kazuyuki Umebayashi, both of Tokyo, Japan

[73] Assignees: Aisin Seiki Kabushiki Kaisha, Japan; Kabushiki Kaisha Shinsangyokaihatsu, Japan

[21] Appl. No.: 177,271

[22] Filed: Apr. 4, 1988

[30] Foreign Application Priority Data

Apr. 3, 1987 [JP] Japan .................................. 62-82300

[51] Int. Cl.[4] ............................................ H04M 1/23
[52] U.S. Cl. ...................................... 379/58; 455/127; 455/343
[58] Field of Search ...................... 379/58, 63, 59, 56; 458/127, 343

[56] References Cited

U.S. PATENT DOCUMENTS

| | | | |
|---|---|---|---|
| 3,962,553 | 6/1976 | Linder et al. | 379/61 |
| 4,562,307 | 12/1985 | Bursztejn et al. | 455/343 |
| 4,591,914 | 5/1986 | Haramada et al. | 358/190 |
| 4,598,258 | 7/1986 | Babano | 331/14 |
| 4,600,948 | 7/1986 | Dangschat | 358/190 |
| 4,647,722 | 3/1987 | Nishida et al. | 379/63 |
| 4,698,748 | 10/1987 | Jazswik et al. | 364/200 |
| 4,723,304 | 2/1988 | Maeda | 455/69 |
| 4,731,814 | 3/1988 | Becker et al. | 379/62 |
| 4,733,100 | 3/1988 | Nusairat | 307/9 |
| 4,736,410 | 4/1988 | Nishida et al. | 379/354 |
| 4,736,461 | 4/1988 | Kawasaki et al. | 455/343 |

Primary Examiner—Robert Lev
Attorney, Agent, or Firm—Sughrue, Mion, Zinn, Macpeak & Seas

[57] ABSTRACT

A telephone apparatus has a telephone set including a wireless handset, a wireless transmitter, a wireless receiver, a signal identifying circuit for discriminating received signals to generate or erase power-on signals, a telephone set power supply circuit having a secondary battery cluster and switch circuits for applying the voltage of the secondary battery cluster to the above-described elements during a predetermined period, a power supply terminal connected to the secondary battery cluster, and a telephone set power supply controlling circuit; a main power supply; a power supply switch; a connection switching circuit for selectively connecting the power supply terminal to the power supply switch or a predetermined load; and a telephone power supply control instructing circuit responsive to the closing of the power supply switch for operating the connection switching circuit to form a connection between the power supply terminal and the predetermined load to transmit a first signal, subsequently operating the connection switching circuit to form a connection between the power supply terminal and the power supply switch to transmit a second signal in response to the opening of the power supply switch.

6 Claims, 5 Drawing Sheets

TELEPHONE APPARATUS

BACKGROUND OF THE INVENTION

1. Field of the Invention

The present invention relates to a telephone apparatus, and, in particular, but not exclusively, to improved on-off control over the power supply of a telephone apparatus which can be arranged at the center oft he steering wheel of a vehicle.

2. DESCRIPTION OF THE RELATED ART

As an example, Japanese Patent Laid-open No. 82541/1986 discloses a telephone apparatus comprised of a mobile radiotelephone incorporated in a vehicle, an operator pad supported at the center of a steering wheel by means of a floating mechanism in a stationary manner irrespective of the rotation of the steering wheel, and an independent handset detachably received by the operator pad. The handset is provided with an independent power supply circuit including a secondary battery cluster, and the pad is provided with a charging circuit for supplying power to the telephone handset power supply circuit. Power is supplied from a vehicle battery to the charging circuit through a slip-ring connector of the floating mechanism. When the handset is placed on the pad, the telephone handset power supply circuit is electrically connected to the charging circuit of the pad, and power is supplied from the vehicle battery to the handset so that the secondary battery cluster is charged. The pad is located at the center of the steering wheel by means of the floating mechanism, and this wheel is adapted to be rotated about the pad. However, since such a telephone apparatus needs a multiplicity of lines such as a power line for supplying power from the vehicle battery to the pad as well as signal lines between the pad and the mobile radiotelephone set (parent telephone set) disposed separately from the pad, it is difficult to arrange almost all of the lines from a steering column cover to the pad by means of wires. For this reasons, the aforementioned Japanese Patent Laid-open No. 83541/1986 proposes that the parent telephone set and the handset are provided with wireless transmitter/receivers, respectively, so that communication can be made between the handset and the parent telephone set by means of their respective wireless transmitter/-receivers. A current path which connects the pad through the steering column to the vehicle battery is constituted by a single line with a slip-ring connector, which line is connected to the positive terminal of the vehicle battery voltage. The grounding line of the pad, which is connected to the floating mechanism, is grounded into a vehicle body through the floating mechanism.

The handset is provided with a telephone set power supply switch. When a driver enters to vehicle he turns on the switch and when the driver leaves he turns off the switch.

However, if the driver in the vehicle fails to turn on the power supply switch of the handset, when the parent set calls the handset, the handset does not respond to the call. If the parent set is of a type which has no alarm function, such as a buzzer, for informing the driver of the selection of the handset operation mode, the driver cannot notice the fact that the parent set is calling the handset. If the parent set has an alarm function such as a buzzer which operates even in the handset selection mode, a driver and a passenger inconveniently cannot easily determined whether the parent set of the handset is being called. On the other hand, even when the driver forgets to turn off the power supply switch of the handset and leaves the vehicle, an engine key switch is turned off to stop the supply of power from the vehicle battery to the pad or the handset. Therefore, the vehicle battery is not drained, but the secondary battery cluster within the handset drains. It is a significant waste for the handset to use power when nobody is in the vehicle, and this leas to the deterioration of the secondary battery cluster.

SUMMARY OF THE INVENTION

It is therefore an object of the present invention to provide a telephone apparatus in which the complicated on-off operation of the power supply of a telephone set such as a handset can be eliminated and in which a waste of power by the telephone set can be prevented.

To achieve the above and other objects, in accordance with the present invention, there is provided a telephone apparatus which is arranged to automatically turn on and off the power supply of a telephone set such as a handset in response to the ON-OFF operations of a main power supply (for example, a vehicle battery).

In one aspect, a telephone apparatus according to the present invention comprises a telephone set including a handset, a transmitter, a receiver, signal identifying means for discriminating received signals, the signal identifying means arranged to generate a first power-on signal at the time of identification of a first signal and to erase the first power-on signal at the time of identification of a second signal, a telephone set power supply circuit having secondary battery means and switch circuits arranged to apply the voltage of the secondary battery means to each of the elements during the period in which one of the first power-on signal and a second power-on signal are provided, a power supply terminal connected to the secondary battery means, and a telephone set power supply controlling means disposed between the secondary battery means and the power supply terminal for detecting power supplied from the secondary battery means toward the power supply terminal, the telephone set power supply controlling means arranged to generate the second power-on signal when the power is detected; a main power supply; a power supply switch for electrically connecting the power supply terminal to the main power supply; connection switching means disposed between the power supply switch and the power supply terminal for selectively connecting the power supply terminal to one of the power supply switch and a predetermined load; and a telephone power supply control instructing means responsive to the closing of the power supply switch for operating the connection switching means to form a connection between the power supply terminal and the predetermined load to transmit the first signal, subsequently operating the connection switching means to form a connection between the power supply terminal and the power supply switch to transmit the second signal in response to the opening of the power supply switch.

In accordance with the present invention, when the power switch through which power is supplied from the main power source is closed, the instruction means for instructing control over the telephone set power supply operates the connection switching means to form a connection between the power supply terminal and the predetermined load. Thus, an electric current flows from the secondary battery cluster of the telephone set power supply circuit to the predetermined load, and the control means for controlling the telephone set power supply generates the second power-on signal. Switch circuits supply voltages to the respective elements of the telephone set in response to the second power-on signal, that is, the power supply of the telephone set is turned on. Then, the instruction means transmits the first signal, and the signal identifying means of the telephone set identifies the first signal and generates the first power-on signal. The first power-on signal does not disappear until the instruction means subsequently transmits the second signal. Then, the instructing means operates the connection switching means to form the connection between the power supply terminal and the power switch, and thus the second power-on signal disappears. However, power from the main power supply is supplied to the telephone set power supply circuit through an electrical loop of the main power supply—the power supply switch—the power supply terminal—the secondary battery cluster, and the switch circuits are held on in response to the aforesaid first power-on signal, so that voltages are continuously applied to the respective elements of the telephone set. That is to say, the telephone is held in a power-on state. The above operation is the operation executed when the power supply switch is turned on.

When the power supply switch is opened, the instructing means transmits the second signal, and the signal identifying means of the telephone set erases the first power-on signal. At this point in time, the switch circuits of the telephone set power supply circuit are held in the off state in response to only the first power-on signal Therefore, as the first power-on signal disappears, the switch circuits switch off, that is, the telephone set power supply circuit is turned off.

In this manner, power from the main power supply is supplied to the main telephone set through the main power suply line to the telephone set which is the single line of the power supply terminal—the connection switching means the power supply switch—the main power supply. In addition, the telephone set power supply circuit is switched on by automatically switching the connection switching means to the contact on the side of the predetermined load in response to the ON operation of the power supply switch transmitting the first signal to the telephone set during that switching, and switching the connection switching means back to the contact on the side of the power supply switch. The telephone set power supply circuit is switched off by automatically transmitting the second signal to the telephone set in response to the OFF operation of the power supply switch.

Accordingly, while the telephone set is separated from the position of the main power supply and the power supply switch, that is, by a so-called automatic remote control, the power of the telephone set is automatically turned on and off by turning on and off the power supply switch. More specifically, when the main power supplies are turned on, the power supply circuit of the telephone set is automatically turned on, but when the main power supplies are turned off, the power supply circuit of the telephone set is turned off. Accordingly, it is possible to solve the previously-described problems involved in the prior art which are derived from the on-off operation of the telephone set power supply switch.

The other objects and features will become apparent from the following description of a preferred embodiment of the present invention, taken with reference to the accompanying drawing.

BRIEF DESCRIPTION OF THE DRAWINGS

FIGS. 1a and 1b illustrate one preferred embodiment of the present invention, in which FIG. 1a is a block diagram illustrating an electrical circuit arrangement incorporated in the steering column cover of a vehicle and FIG. 1b is a block diagram illustrating the electrical circuit arrangements of a handset and a pad unit disposed at the center of the steering wheel;

FIGS. 3a and 3b are flow charts mainly showing the telephone set power supply on-off control operation of the microprocess shown in FIG. 1a.

DESCRIPTION OF THE PREFERRED EMBODIMENT

Figure 1A:
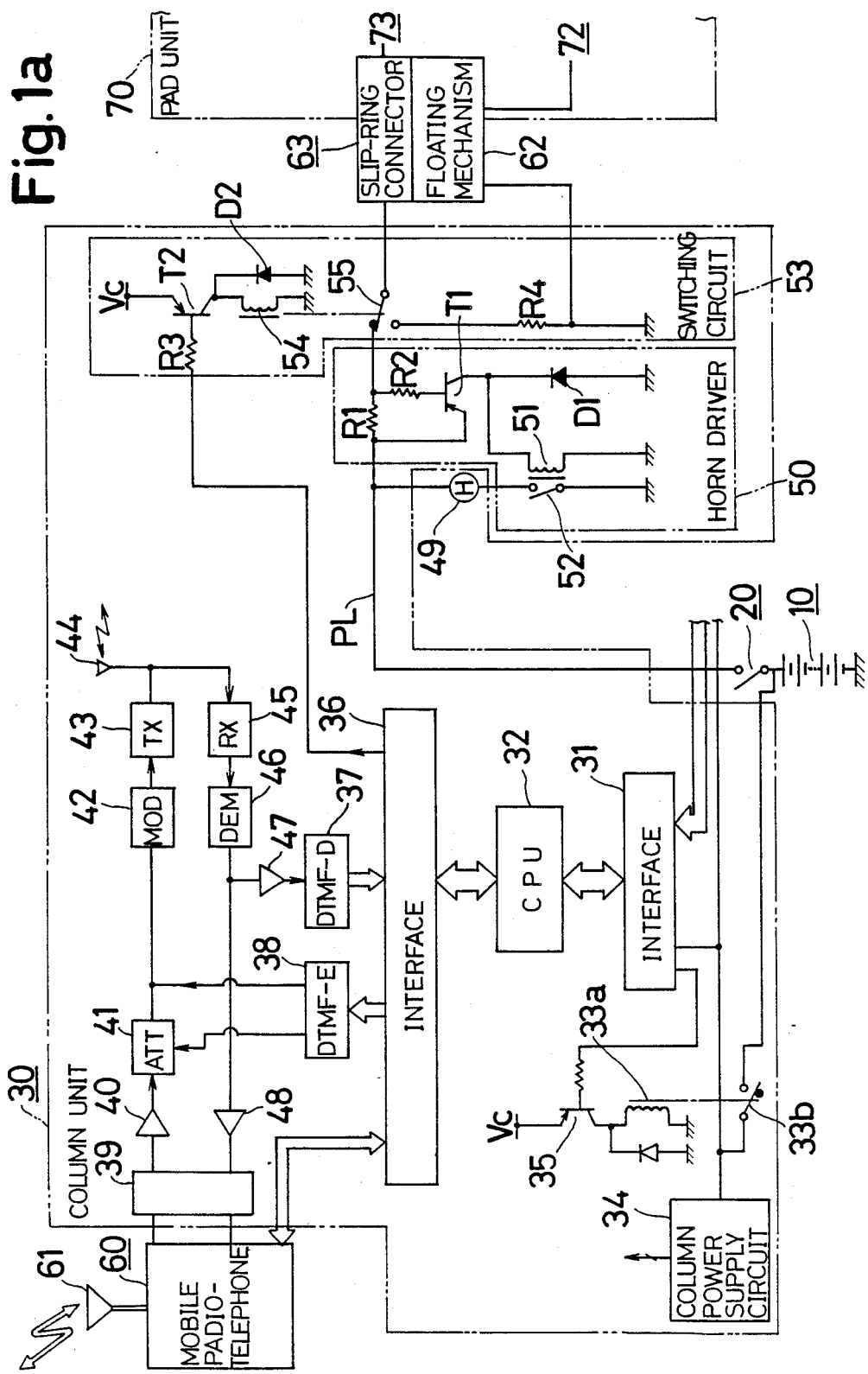
Figure 1B:
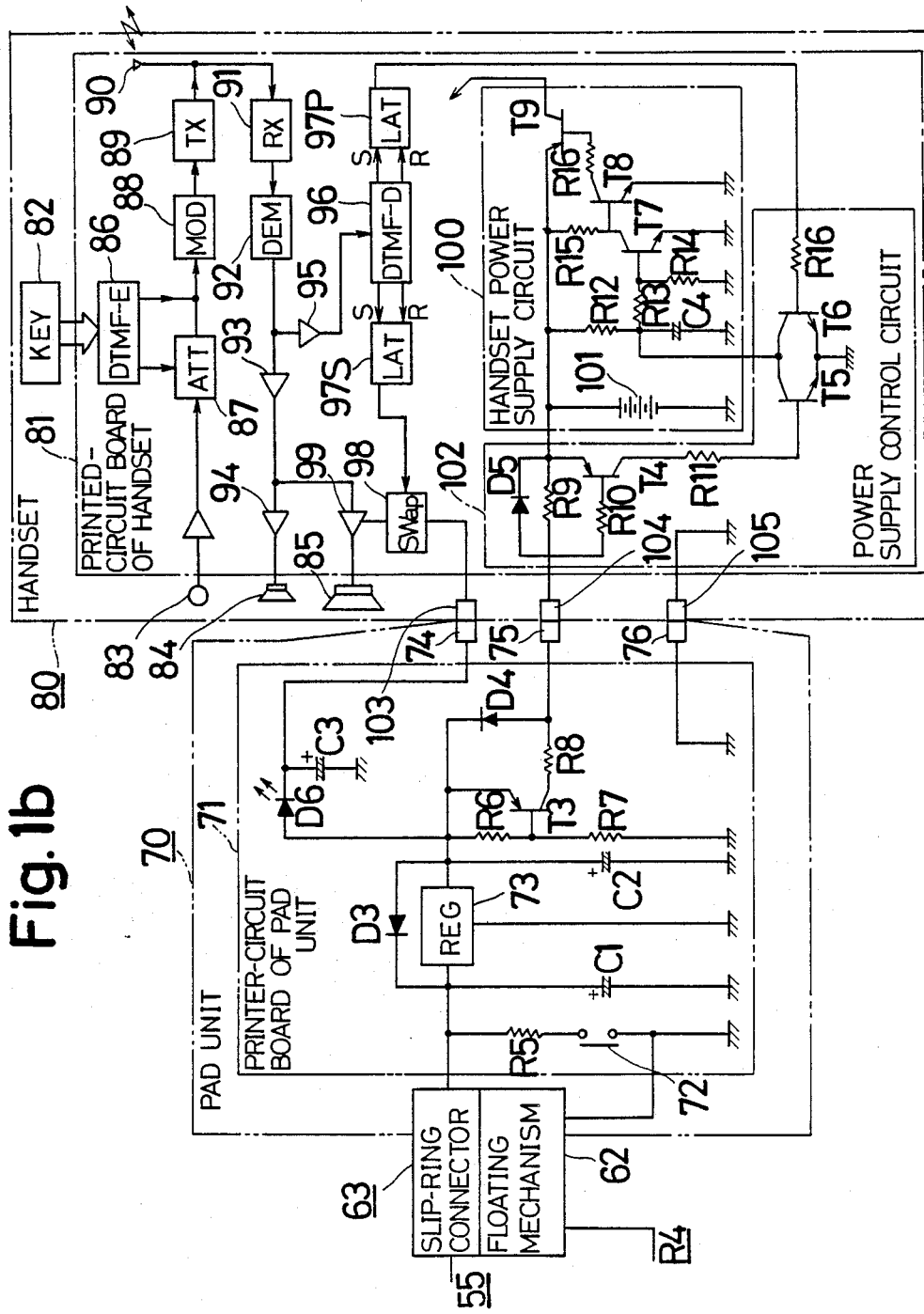

FIGS. 1a and 1b show in combination one preferred embodiment of the present invention. This embodiment illustrates a mobile radiotelephone apparatus for incorporation in a vehicle, which is similar to the telephone apparatus disclosed in Japanese Patent Laid-open No. 82541/1986. FIG. 1a mainly shows elements which are fixedly disposed in a vehicle but at a location away from a steering wheel, while FIG. 1b shows a pad 70 which is carried by a steering shaft at the center of the steering wheel in a stationary manner and an independent telephone set, that is, a handset 80 which is carried on the pad 70.

Referring first to FIG. 1a, a column unit 30 is connected to a mobile radiotelephone set 60 (hereinafter referred to as "parent machine") incorporated in a vehicle. This column unit 30 is connected to a battery cluster 10 and an engine key switch 20 which are disposed in the vehicle. The pad unit 70 is connected to the column unit 30 through a slip-ring connector 63. The column unit 30 is incorporated in a stationary steering column cover (not shown).

The pad unit 70 is secured in a pad (indicated at 70 in FIG. 2a) which is carried via a floating mechanism on the steering shaft (not shown) in a stationary state irrespective of the rotation of the shaft.

It is to be noted that the floating mechanism 62 and the slip-ring connector 63 are previously disclosed in Japanese Patent Laid-open No. 81841/1986, Japanese Patent Laid-open No. 81251/1986, and Japanese Patent Laid-open No. 82541/1986.

A single power line PL is connected to the battery cluster 10 through the engine key switch 20. The power line PL is further connected to a relay contact piece 55 of a switching circuit 53 for switching connections through a load resistor R1 for detecting the ON state of a horn switch 72 (FIG. 1b) of a horn driver 50, as well as through the slip-ring connector 63 to a positive voltage input terminal of a printed circuit board 71 (FIG. 1b) of the pad unit 70.

When the key switch 20 is closed, a voltage is applied from the battery cluster 10 to the positive voltage input terminal of the printed circuit board 71 of the pad unit 70. A grounding terminal of the printed circuit board 71 of the pad unit 70 is connected to mechanical elements which constitute the floating mechanism 62 and, in turn, is electrically connected through the mechanism 62 to a grounding conductor of the column unit 30.

The column unit 30 has a wireless transmitter constituted by elements 39 to 44 and a wireless receiver constituted by elements 44 to 48 and 37 to 39, and the wireless transmitter and the wireless receiver are connected to the parent machine 60. The wireless transmitter and receiver include the encoder 38 for generating codes to be transmitted and the decoder 37 for decoding received codes, the encoder 38 and the decoder 37 functioning to transmit control codes to the handset 80 (FIG. 1b) and to receive control codes from the handset 80. An attenuator 41 which constitute a part of the wireless transmitter includes an attenuator device and a selector switch. Therefore while the control codes are being transmitted to the handset 80, the attenuator 41 attenuates and substantially blocks communication signals which are transmitted from the parent machine 60. During a call between the parent machine 60 and the handset 80, the attenuator 41 passes communication signals transmitted from the parent machine 60, substantially without attenuating the level of the signals A control signal line from the parent machine 60, a code instruction data input line from the encoder 38, and an output data line from the decoder 37 are connected through an interface 36 to a microprocessor 32 (hereinafter referred to as "CPU").

A column power supply circuit 34 is connected to the power line PL, and supplies a predetermined voltage to each portion of the column unit 30. A contact piece 33b of a self-hold relay 33a is inserted between the input voltage line of the column power supply circuit 34 and the battery cluster 10. When a transistor 35 is turned on, the self-hold relay 33a sets the contact piece 33b to its closed state. The CPU 32 provides on-off control over the transistor 35 through the interface 31.

When a transistor T2 is turned on, a connection switching relay 54 of the switching circuit 53 switches the relay contact piece 55 from a contact on the side of the horn driver 50 to a contact on the side of a load resistor R4 for energizing a handset power source. The CPU 32 provides on-off control over the transistor T2 through the interface 36.

As shown in FIG. 1a, if the relay contact piece 55 is connected to the contact on the side of the horn driver 50 and the key switch 20 is closed, when the horn switch 72 (FIG. 1b) of the pad unit 70, a current flows through a loop which is constituted by the battery cluster 10, the key switch 20, the a load resistor R1 for instructing the energization of a horn, the contact piece 55 and the horn switch 72, and a voltage drop occurs in the load resistor R1. This voltage drop causes a transistor T1 of the horn driver 50 to be switched from the OFF state to the ON state and thus the relay 51 is energized to close a relay contact 52. Thus, a current flows into a horn 49 through the power line to cause the horn to generate sound. When the horn switch is again opened, the transistor T1 is again turned off and the contact piece 52 is opened, so that the energization of the horn 49 is ceased. In this manner, the power supply line from the battery cluster 10 to the pad unit 70 is also used as a horn energization instruction line.

Referring to FIG. 1b, the printed circuit board 71 of the pad unit 70 essentially includes a voltage regulating integrated circuit 73; an overcharge preventing circuit constituted by resistors R6, R7, R8 and a transistors T3; diodes D3 and D4 for allowing a current to pass from a power supply circuit 100 of the handset 80 toward the power line PL; and an indicator diode D6 for providing an indication that the power source of a loudspeaker amplifier is turned on. A power supply connection member 75 is connected to the power supply terminal of the printed circuit board 71 of the pad unit 70, a ground connection member 76 is connected to the grounding terminal the board 71, and a loudspeaker amplifier power supply connection member 74 is connected to a cathode of the indicator diode D6. The connection member 74 to 76 are provided at a location such that they can come into contact with connection members 103 to 105 (to be described later) of the handset 80 on a surface of the pad 70 that defines a space for accommodating the handset 80.

Figure 2A:
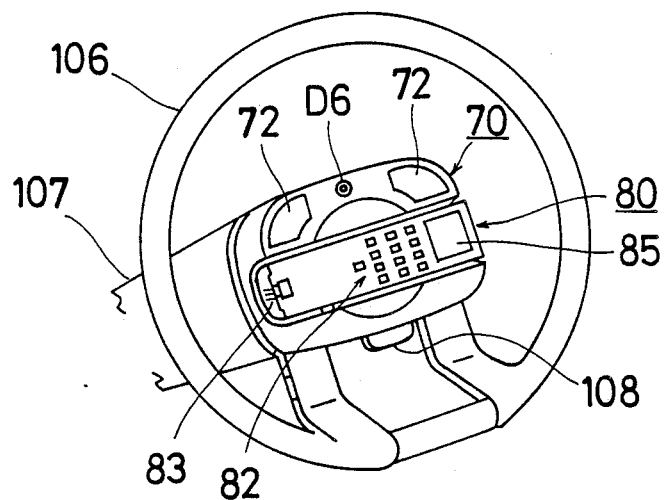
FIG. 2a is a diagrammatic perspective view illustrating the appearance of the pad and the handset according to the embodiment.
Figure 2B:
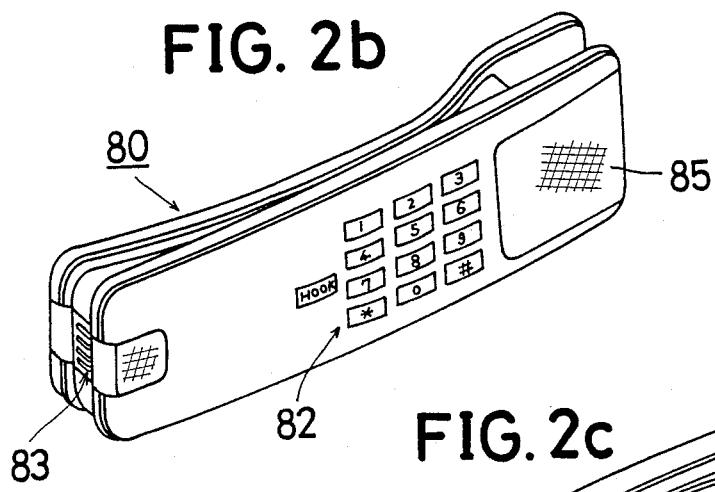
FIG. 2b is an enlarged perspective view illustrating the inner side of the handset shown in FIG. 2b.
Figure 2C:
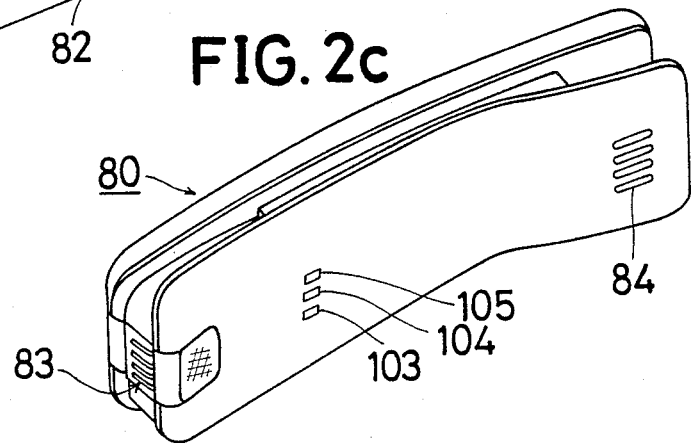
FIG. 2c is a view similar to FIG. 2b, but illustrating the outer side of the handset.

Referring to FIGS. 2a, 2b and 2c, a steering wheel 106 disposed in a vehicle body is shown in FIG. 2a. The above-described column unit 30 is incorporated in the steering column cover. The pad unit 70 is supported by the floating mechanism which is located below the pad unit 70, and the horn switch 72 and the diode D6 indicative of the fact that the power source of the corresponding loudspeaker amplifier is turned on are exposed on a surface of the pad unit 70. A space having a C-like cross section is formed in the pad unit 70 so as to accommodate the handset 80. The pad unit 70 further includes a handset engagement mechanism (not shown) in which, when a lever 108 is pushed (depressed), the handset 80 is released from its engagement and, when the handset 80 is placed in the pad unit 70, the handset 80 is automatically engaged.

The handset 80 has on its inner side (shown in FIG. 2b) the connection members 103 to 105 for contact with the aforesaid connection members 74 to 76 of the pad unit 70, a handset speaker 84 (high directivity and low power), and a mouthpiece constituted by a microphone 83. The outer side (shown in Fig. 2c) of the handset 80 has a key group 82 including a hook switch key for instructing a call, ten numerical keys, and * and # keys used for setting and specifying high functions such as telephone communication, respectively; a loudspeaker 85 (low directivity and high power); and a pickup aperture of the microphone 83 for picking up voice or sound when an operator speaks to the handset 80 at a position separate therefrom.

As shown in FIG. 2a, when the handset 80 is placed in the pad unit 70, the connection members 74 to 76 of the pad unit 70 come into contact with the connection members 103 to 105 of the handset 80 as shown in FIG. 1b.

The construction of the handset 80 will be described with reference to FIG. 1b. A wireless transmitter constituted by elements 87 to 90 and a wire receiver constituted by elements 90 to 94 and 99 are connected to the speakers 84 and 85, respectively. These wireless transmitter and receiver include an encoder 86 for generating codes to be transmitted and a decoder 96 for decoding received codes, the encoder 38 and the decoder 37 functioning to transmit control codes to the column unit 30 (FIG. 1a) and to receive control codes from the column unit 30. An attenuator 87 which constitutes a part of the wireless transmitter includes an attenuator device and a selector switch. Therefore, while the control codes are being transmitted to the column unit 30, the attenuator 87 attenuates and substantially blocks communication signals which are transmitted from the parent microphone 83. During a call between the parent machine 60 and the handset 80, the attenuator 87 passes communication signals transmitted from the microphone 83, substantially without attenuating the level of the signals.

The voltage regulating IC 73 of the pad unit 70 supplies power to an amplifier 99 for energizing the loudspeaker 85 is supplied through a path constituted by a switch 98, the loudspeaker amplifier power supply connection members 103 and 74, and the light emitting diode D6. When the code decoder 96 receives a code indicative of "on -hook", the decoder 96 sets the output of a latch 97S to a high level. Thus, the switch 98 is turned on in response to the high-level output, and power for the loudspeaker 85 is applied to the amplifier 99. On the other hand, when the code decoder 96 receives a codes indicative of "off-hook", the decoder 96 resets the output of the latch 97S to a low level. Thus, the switch 98 is turned off in response to the low-level output, and the power to the amplifier 99 is shut off.

The power supply connection member 104 of the handset 80 which comes into contact with the power supply connection member 75 of the pad unit 70 is connected to the handset power supply circuit 100 through a reverse-current detecting resistor R9 of a power supply control circuit 102.

The handset power supply circuit 100 is constituted by a secondary battery cluster 101 (nickel-cadmium battery cluster), an output transistor T9, transistors T7 and T8 for switching control, and the like. When a low-level voltage is applied to the base of the transistor T7, the transistor T7 is turned off, the transistor T8 on, and the transistor T9 on. Thus, the collector voltage of the transistor T9 is applied to each element of the handset 80 (telephone set power on). When a high-level voltage is applied to the base of the transistor T7, the transistor T9 is turned off and power is not supplied to the transmitter/receiver lines in the handset 80 (telephone set power off).

If the relay contact piece 55 (FIG. 1a) is connected to the contact on the side of the load resistor R4, a current from the secondary battery cluster 101 flows through a path constituted by the resistor R9 of the power supply control circuit 102, the connection members 104 and 75, the diodes D4 and D3 of the pad unit 70, the slip-ring connector 63, the contact piece 55, and the load resistor R4. Thus, a voltage drop occurs at the resistor R9, and the transistor T4 of the power supply control circuit 102 is switched from the ON state to the OFF state and the transistor T5, in turn, is switched from the OFF state to the ON state. Therefore, the base of the transistor T7 of the handset power supply circuit 100 goes to a low lever and the transistor T9 is turned on (telephone set power on). This is the operation of turning on the handset power supply circuit 100 (telephone set power on) in response to a second power-on signal (a low-level signal applied to the base of the transistor T7 when the transistor T5 is turned on).

When the code decoder 96 receives a first code (a first signal) which instructs "telephone set power on: power on", the decoder 96 sets the output of a latch 97P to a high level. The transistor T6 of the power supply control circuit 102 is switched from the OFF state to the ON state in response to the high-level output, and the base of the transistor T7 of the handset power supply circuit 100 goes to a low level and the transistor T9, in turn, is turned on (telephone set power on). This is the operation of turning on the handset power supply circuit 100 (telephone set power on) in response to a first power-on signal (a low-level signal applied to the base of the transistor T7 when the transistor T6 is turned on).

When the code decoder 96 receives a second code (a second signal) which specifies "telephone set power off: power off", the decoder 96 sets the output of the latch 97P to a low level. The transistor T6 of the power supply control circuit 102 is switched from the ON state to the OFF state in response to the low-level output, and the base of the transistor T7 of the handset power supply circuit 100 goes to a high level (the first power-on signal is erased) and the transistor T9, in turn, is turned off (telephone set power off). This is the operation of turning off the handset power supply circuit 100 (telephone set power off) in response to the erasure of the first power-on signal.

As described above, when the relay contact piece 55 is connected to the contact on the side of the load resistor R4, the telephone set power supply is turned on (by the operation of the transistor T9 of the handset power supply circuit 100). When the relay contact piece 55 is returned to the contact on the side of the horn driver 50, a voltage is applied from the battery cluster 10 to the power supply circuit 100, but, in this state, the telephone set power supply (100) is returned to the OFF state. Therefore, when the relay contact piece 55 is kept connected to the contact corresponding to the load resistor R4, it is necessary to transmit the first code which instructs "power on" to the handset 80 so that the output of the latch 97P can be set to a high level. This setting enables the telephone power supply (100) to be held on even if the relay contact piece 55 is returned to the contact on the side of the horn driver 50. This power-on control is provided by the CPU 32 in response to the switch-over of the key switch 20 from the open state to the closed state. Similarly, the CPU 32 responds to the switch-over of the key switch 20 from the closed state to the open state and transmits the second code which instructs "power-off" to set the output of the latch 97P to a low level. In this manner, the CPU 32 needs to provide off control over the telephone power after the key switch 20 has been opened, and it is therefore necessary to hold the power supply for the CPU 32 and other elements until this off control has been completed. Accordingly, the self-hold contact piece 33b is kept in its closed state by means of the self-hold relay 33a so that the power supply 34 of the column unit 30 is held on.

Figure 3A:
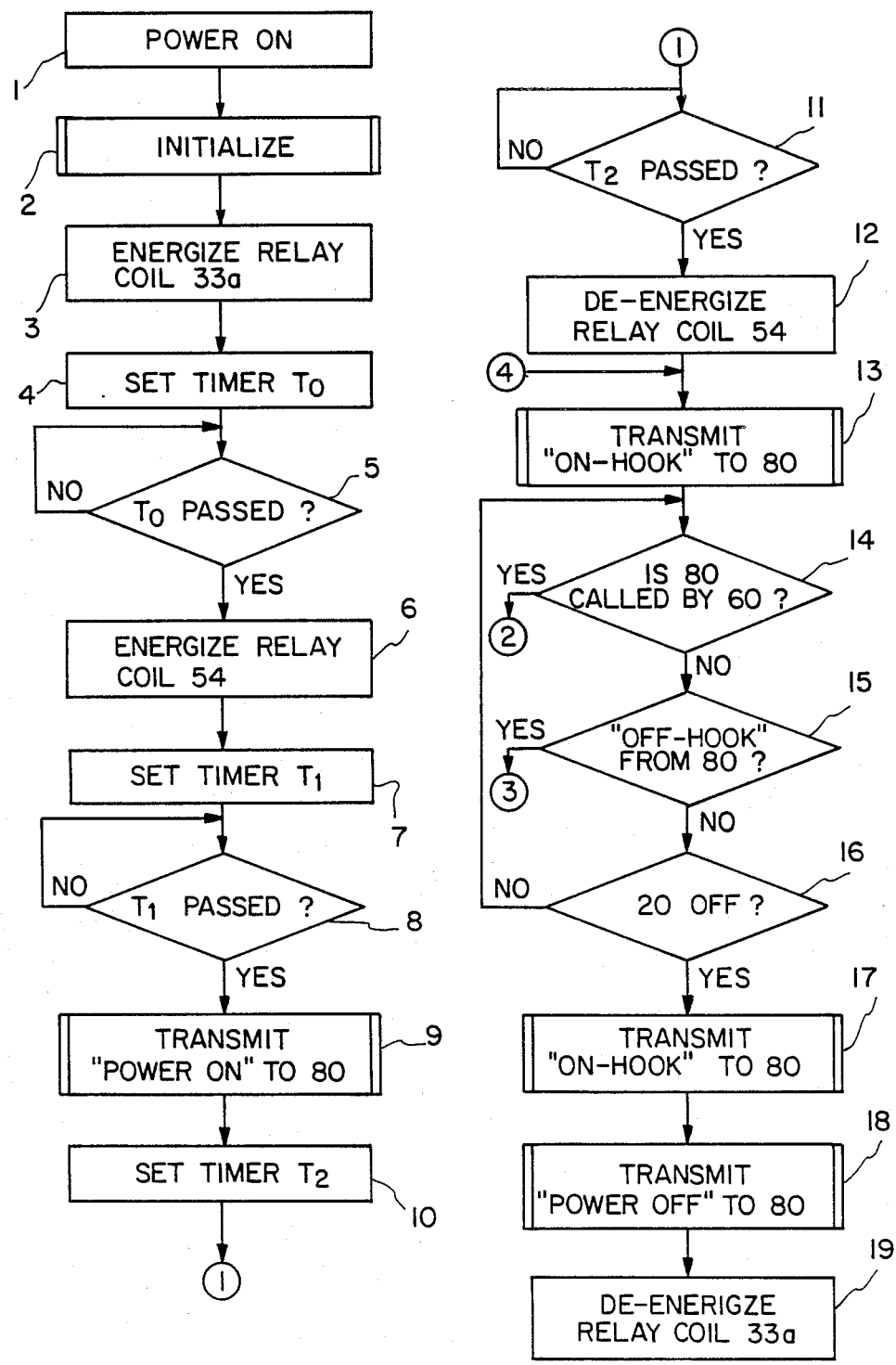
Figure 3B:
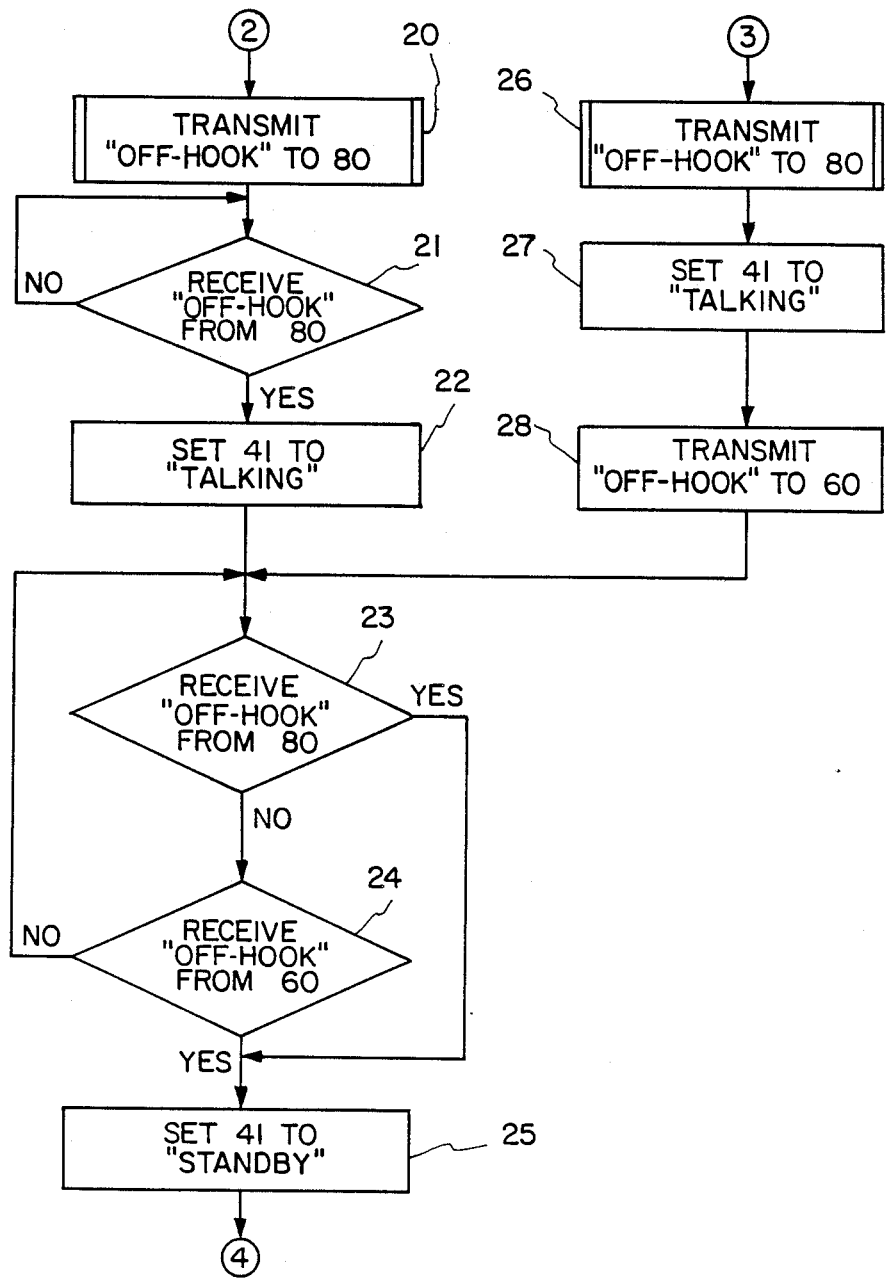

FIGS. 3a and 3b are flow charts which illustrate the control operations executed by the CPU 32, particularly, on-off control over the telephone set power supply. The on-off control provided by the CPU 32 over the telephone set power supply will be described below with reference to FIGS. 3a and 3b.

When the engine key switch 20 is closed, the column power supply circuit 34 is connected through the switch 20 to the battery cluster 10, and that circuit 34 applies a predetermined voltage to each portion of the column unit 30 (column power on). Thus, the predetermined voltage is applied to the CPU 32 (in Step 1). (The term "Step" is omitted in the following parentheses for the sake of simplicity.)

When the predetermined voltage is applied to the CPU 32, the CPU 32 supplies standby signals to its input/output port and initializes the internal circuits of the CPU 32, such as a counter, registers, flags and timers. Then, the CPU 32 reads a state signal from a state signal line (not shown) and determine whether the system is ready (normal) or unready (abnormal). If any abnormal state is detected, the CPU 32 is held on standby (2). If it is determined that the system is ready, the CPU 32 turns on the transistor 35 (3).

When the transistor 35 is turned on, the relay coil 33a is energized to set the relay contact piece 33b to its closed position, thereby forming a current path which connects the battery cluster 10, the contact piece 33b and the column power supply circuit 34. Therefore, even if the key switch 20 is opened, the power of the column unit 30 is held on.

Then, the CPU 32 sets a timer T (a programmable timer for counting a time interval T) (4), and waits for the time T to elapse (5). The time interval T is so selected as to be a little longer than the period from the moment at which the CPU 32 latches a signal for turning on the transistor 35 in an output port for energizing the base of the transistor 35 to the moment at which a current path of the battery cluster 10—the contact piece 33b—the column power supply circuit 34 is actually formed.

Then, the CPU 32 executes control operations of Steps 6 to 12 that correspond to "telephone set power on". First, the CPU 32 turns off the transistor T2 (6) and waits for a time interval $T_1$ to elapse. The time interval $T_1$ is so selected as to be a little longer than the period from the moment at which the CPU 32 latches a signal for turning on the transistor T2 to the moment at which the handset 80 is set to a wireless-communication enable state. More specifically, during that period, the signal for turning on the transistor T2 is latched in the output port of the CPU 32, the relay contact piece 55 is positively connected to the contact on the side of the resistor R4, the secondary battery cluster 101 thus discharges a voltage along an electrical loop of the resistor R9—the connection members 104, 75—the diodes D3, D4—the slip-ring connector 63—the contact piece 55—the load resistor R4, the transistors T4 and T5 of the power supply control circuit 102 of the handset 80 conduct in response to the thus-supplied voltage, a capacitor C4 of the handset power supply circuit 100 is caused to discharge by the conduction of the transistor T5, the base of the output transistor T9 of the handset power supply circuit 100 is reset to a low-level state (the second power-on signal) so that the transistor T9 is switched from the OFF state to the ON state (telephone set power on), and the wireless receiver and transmitter of the handset 80 assume their operation-enable states.

When the time interval $T_1$ has elapsed, the CPU 32 transmits the first code (the first signal) which instructs "power on" to the handset 80 (9). This transmission is executed by supplying a "power on" instruction code to the encoder 38 and instructing it to transmit the first code. The encoder 38 stores the received code in shift registers for forming data indicative of the leading end and the trailing end of a data frame and a data frame according to the instruction code. If an instruction indicative of signal transmission is detected, the CPU 32 sets the attenuator 41 to a high attuation mode and connects the shift resisters in a ring-group form (a connection in which a serial output is returned to a serial input), and outputs the data of the shift register to a modulator 42 by predetermined times, repetitively and serially.

When the code decoder 96 of the handset 80 receives this power-on instruction data, the decoder 96 supplied a set signal to a set input terminal S of the latch 97P.

Thus, the latch 97P is set and a high level signal is applied to the transistor T6 of the power supply control circuit 102, so that the transistor T6 is turned on (at this point in time, the transistor T5 is also on) and supplies a low level signal (first power-on signal) to the base of the transistor T7.

Then, the CPU 32 waits a time interval $T_2$ to elapse (10 and 11). The time interval $T_2$ is a little longer than the period from the moment at which the CPU 32 instructs the encoder 38 to transmit power-on data to the moment at which the transistor T6 is turned on.

When the time interval $T_2$ has elapsed, the CPU 32 turns on the transistor T2, that is, switches over the transistor T2 from the ON state to the OFF state. Thus, power to the relay coil 54 is shut off and the relay contact piece 55 returns to the contact on the side of the horn driver 50 shown in FIG. 1a. The voltage of the battery cluster 10 is applied to the printed circuit board 71 of the pad unit 70 through a path of the resistor R1—the contact piece 55—the slip-ring connector 63, and a constant voltage is supplied from the printed circuit board 71 through the connection members 72 and 103 to the switch 98 and also to the secondary battery cluster 101 through the connection members 75 and 104 and the resistor R4.

Simultaneously, since the contact piece 55 is separated from the resistor R4, the current which flows through the resistor R9 from the secondary battery cluster 101 toward the connection member 104 disappears, but a reverse discharge current flows through the resistor R9 into the secondary battery cluster 101. Thus, the transistors T4 and T5 of the power supply control circuit 102 are turned off (the disappearance of the second power-on signal). However, since the transistor T6 is on (the first power-on signal is present), the output transistor T9 of the handset power supply circuit 100 is held on (telephone set power on).

The above-described operation is the telephone set power on control operation executed by the CPU 32 and the associated elements in response to the switchover of the engine key switch 20 from the open state to the closed state.

Subsequently, the CPU 32 transmits to the handset 80 a code indicative of "on-hook: the fact that the handset 80 is placed on a cradle, that is, the telephone set is net in use (13). This operation is performed in the same manner as the above-described transmission of power-on signals. When the code decoder 96 of the handset 80 receives the "on-hook" code, the decoder 96 supplies a reset signal to the latch 97S. Thus, the output of the latch 97S is reset to a low level for the sake of a positive operation (although, at this point in time, the latch 97S is reset since the power is turned on immediately before). If the latch 97S is held in a reset state, the latch 97S provides a low level output and hence the switch 98 is turned off, so that a loudspeaker power from the printed circuit board 71 of the pad unit 70 is applied to the loudspeaker amplifier 99.

This completes the telephone set power on control provided by the CPU 32 when the key switch 20 is closed. Thereafter, if the CPU 32 receives a call for designating the handset 80 from the parent machine 60 (14), the CPU 32 executes talking control in Steps 20 to 25 shown in FIG. 3b. First, the CPU 32 transmits to the handset 80 a code indicative of "off-hook: the fact that the handset 80 is removed from a cradle, that is, the telephone set is in use (14). When the code decoder 96 of the handset 80 receives the "off-hook" code, the decoder 96 supplies a set signal to the latch 97S. Thus, the output of the latch 97S is set to a high level and the switch 98 is closed, so that loudspeaker power is applied to the loudspeaker amplifier 99 through the connection members 74 and 103. In this state, a communication signal (a call) from the parent machine 60 is transmitted to the handset 80 through the wireless transmitter of the column unit 30 and is received by the wireless receiver of the handset 80. Thus, a loudspeaker is made to generate a ringing tone. When a driver (a person who drives a car) depresses the hook key 82' of the handset 80, talking is enabled. The CPU 32 waits for the arrival of the "off-hook" signal indicative of the depression of the hook key 82' from the handset 80. When the driver depresses the hook key 82', a signal representative of this depression is transmitted to the column unit 30 by means of the wireless transmitter of the handset 80, and the code decoder 37 receives the signal to inform the CPU 32 of the depression of the hook key 82'. When receiving the "off-hook" signal, the CPU 32 set the attenuator to a "talking: low attenuation" mode (22). Thus, a voice signal at a high level is transmitted from the parent machine 60 to the handset 80.

The driver can talk with the handset 80 placed in the pad unit 70, or with the handset 80 in his hand. If the handset 80 is placed in the pad unit 70, the loudspeaker amplifier 99 which includes a loudspeaker power supply drives the loudspeaker 99 to reproduce the voice transmitted from a remote station. If the driver takes off the handset 80 from pad unit 70, the connection members 103 to 105 are separated from the the connection members 74 to 76 of the pad unit 70, and the power supply of the loudspeaker amplifier 99 is turned off. Therefore, the driver can listen to voice from the handset speaker 84 only. In this state, power is supplied from the secondary battery cluster 101 to each portion of the handset 80, so the power consumption of the secondary battery cluster 101 increases.

When the parent machine 60 transmits an "on-hook" signal (24) or the handset 80 transmits an "on-hook" signal in response to the depression of the hook key 82' (23), the CPU 32 resets the attenuator to the high-attenuation state. This completes the talking control responsive to a call from the parent machine 60.

If the CPU 32 receives an "off-hook" signal for specifying talking (including the setting or using of a high degree of function such as the registration of abbreviated numbers) from the handset 80 (14), the CPU 32 executes talking control in Steps 26 to 28 and 23 to 25 shown in FIG. 3b as well as the processing for setting-/using high-degree functions. First, the CPU 32 transmits an "off-hook" signal to the handset 80 (26) and the code decoder 96 of the handset 80 receives the off-hook signal to set the output of the latch 97S to a high level. Thus, the switch 98 is closed and loudspeaker power is supplied to the loudspeaker amplifier 99 (if the handset 80 is placed in the pad unit 70).

Then, the CPU 32 sets the attenuator 41 to the "talking: low attenuation" mode (27), and transmits an "off-hook" signal of the handset 80 to the parent machine 60 through the control signal line. Thereafter, the CPU 32 waits for the parent machine 60 to informs the CPU 32 of the on-hook state of a talking remote station in the exterior of the car (24) through the control signal line, or waits for the handset 80 to transmit an "on-hook" signal to the CPU 32 (23). When receiving either of the on-hook signals, the CPU 32 resets the attenuator 41 to the standby: high attenuation" mode. This completes the talking control responsive to a call from the handset 80.

Referring back to FIG. 3a, the CPU 32 monitors the potental of the power line PL while executing no talking control. If the potential of the power line PL reaches a voltage not higher than the maximum chargeable voltage of the secondary battery cluster 101 (this voltage is lower than the voltage of the battery cluster 10), the CPU 32 judges that the engine key switch 20 is opened, and causes the process to proceed from Step 16 to Step 17. In Step 17, the CPU 32 transmits an "on-hook" code to the handset 80, opens the switch 98, and (18) transmits a code (the second signal) indicative of "power off" to the handset 80. When the code decoder 96 of the handset 80 receives the "power-off" code, the decoder 96 supplies a reset signal to the latch 97P. Thus, the output of the latch 97P is reset to a low level, and the transistor T6 of the power supply control circuit 102 is turned off and the base of the transistor T7 of the handset power supply circuit is set to a high level (the disappearance of the first power-on signal). Therefore, the transistor T7 is turned on, the transistor T8 is turned off, and the output transistor T9 is turned off (telephone set power off).

The above-described embodiment of the present invention is suitable for use as a telephone apparatus for incorporation in a vehicle. However, the present invention, which is not confined solely to such an application, can be applied to telephone apparatus of various other kinds that require a similar telephone set power control function.

The above-described present invention provides the following effects and advantages.

When a power switch (20) through which power is supplied from a main power source (10) is closed, an instruction means (32) for instructing control over a telephone set power supply operates a connection switching means (55) to form the connection between a power supply terminal (104) and a predetermined load (R4). Thus, an electric current flows from a secondary battery cluster (101) of a telephone set power supply circuit (100) to the predetermined load (R4), and a control means (102) for controlling the telephone set power supply generates a second power-on signal (a low level signal generated by turning on T5). Switch circuits (T7 to T9) supply voltages to the respective elements of a telephone set (80) in response to the second power-on signal, that is, the power supply (100) of the telephone set (80) is turned on. Then, the instruction means (32) transmits a first signal (a power-on code), and a signal identifying means (96) of the telephone set (80) identifies the first signal and generates a first power-on signal (a low-level signal generated by turning on the T6). The first power-on signal does not disappear until the instruction means (32) subsequently transmits the second signal (power-off code). Then, the instructing means (32) operates the connection switching means (55) to form the connection between the power supply terminal (104) and the power switch (20), and thus the second power-on signal (the low-level signal generated by turning on the T5) disappears. However, power from the main power supply (10) is supplied to the telephone set power supply circuit (100) through an electrical loop of the main power supply (10)—the power supply switch (20)—the power supply terminal (104)—the secondary battery cluster (101), and the switch circuits (T7 to T9) are held on in response to the aforesaid first power-on signal (the low-level signal produced by turning on the T6), so that voltages are continuously applied to the respective elements of the telephone set (80). That is to say, the telephone (80) is held in a power-on state. The above operation is the operation executed when the power supply switch (20) is turned on.

When the power supply switch (20) is opened, the instructing means (32) transmits the second signal (a power-off code), and the signal identifying means (96) of the telephone set (80) erases the first power-on signal (the low-level signal produced by turning on the T6). At this point in time, the switch circuits (T7 to T9) of the telephone set power supply circuit (100) are held in the off state in response to only the first power-on signal (the low-level signal produced by turning on the T6). Therefore, as the first power-on signal disappears, the switch circuits (T7 to T9) switch off, that is, the telephone set power supply circuit (100) is turned off.

In this manner, power from the main power supply (10) is supplied to the main telephone set (80) through a main power supply line to the telephone set (80) which is a single line of the power supply terminal (104)—the connection switching means (55)—the power supply switch (20)—the main power supply (10). In addition, the telephone set power supply circuit (100) is switched on by automatically switching the connection switching means (55) to a contact on the side of the predetermined load (R4) in response to the ON operation of the power supply switch (20), transmitting the first signal (a power-on code) to the telephone set (80) during that switching, and switching the connection switching means back to a contact on the side of the power supply switch (20). The telephone set power supply circuit (100) is switched off by automatically transmitting the second signal (power-off code) to the telephone set (80) in response to the OFF operation of the power supply switch (20).

Accordingly, while the telephone set (80) is separated from the position of the main power supply (10) and the power supply switch (20), that is, by a so-called automatic remote control, the power of the telephone set (80) is automatically turned on and off by turning on and off the power supply switch (20). More specifically, when the main power supplies (10 and 20) are turned on, the power supply circuit (100) of the telephone set (80) is automatically turned on, but when the main power supplies (10 and 20) are turned off, the power supply circuit (100) of the telephone set (80) is turned off. Accordingly, it is possible to solve the previously-described problems involved in the prior art, that is, the necessity for an operator (driver) to perform complicated operations for the telephone set power supply circuit and a waste of the secondary battery cluster when the operator has forgot to turn off the apparatus.

What is claimed is:

1. A telephone apparatus comprising:
   a telephone set including a handset, a transmitter, a receiver, signal identifying means for discriminating received signals, said signal identifying means arranged to generate a first power-on signal at the time of identification of a first signal and to erase said first power-on signal at the time of identification of a second signal, a telephone set power supply circuit having secondary battery means and switch circuits arranged to apply the voltage of said secondary battery means to each of said elements during the period in which one of said first power-on signal and a second power-on signal are provided, a power supply terminal connected to said secondary battery means, and a telephone set power supply controlling means disposed between said secondary battery means and said power supply terminal for detecting power supplied from said secondary battery means toward said power supply terminal, said telephone set power supply controlling means arranged to generate said second power-on signal when said power is detected;
   a main power supply;
   a power supply switch for electrically connecting said power supply terminal to said main power supply;
   connection switching means disposed between said power supply switch and said power supply terminal for selectively connecting said power supply terminal to one of said power supply switch and a predetermined load; and
   a telephone power supply control instructing means responsive to the closing of said power supply switch for operating said connection switching means to form a connection between said power supply terminal and said predetermined load to transmit said first signal, subsequently operating said connection switching means to form a connection between said power supply terminal and said power supply switch to transmit said second signal in response to the opening of said power supply switch.

2. A telephone apparatus according to claim 1, wherein said transmitter is a wireless transmitter, said receiver being a wireless receiver, and said telephone set power supply control instructing means including a wireless transmitter for transmitting said first and second signals.

3. A telephone apparatus comprising:
   a telephone set including a mouthpiece, an earpiece, a wireless transmitter connected to said mouthpiece, a wireless receiver connected to said earpiece, a signal identifying means for discriminating received signals, said signal identifying means arranged to generate a first power-on signal at the time of identification of a first signal and to erase said first power-on signal at the time of identification of a second signal, a telephone set power supply circuit having secondary battery means and switch circuits arranged to apply the voltage of said secondary battery means to each of said elements during the period in which one of said first power-on signal and a second power-on signal are provided, a power receiving connection member connected to said secondary battery means, and a telephone set power supply controlling means disposed between said secondary battery means and said power receiving connection member for detecting power supplied from said secondary battery means toward said power receiving connection members, said telephone set power supply controlling means arranged to generate said second power-on signal when said power is detected;
   pad means arranged at the center of a steering wheel of a vehicle by means of a floating mechanism in a stationary state irrespective of the rotation of said wheel, said pad means providing support for said telephone set;
   a voltage regulating circuit disposed in said said pad means and including a power supply terminal which can be contacted by said power receiving connection member when said telephone set is placed in a predetermined location, and a diode having an input terminal and an output terminal connected to said power supply connection member, said diode inhibiting the direct flow of a current from said input terminal to said output terminal but permitting a flow reverse to said direct flow;

switching means connected to said input terminal of said voltage regulating circuit through a slip-ring connector of said floating mechanism for selectively connecting said input terminal to one of a predetermined load and a power line connected through an engine key switch to battery means incorporated in a vehicle;

wireless transmitting means for transmitting said first and second signals; and telephone power supply control instructing means responsive to the closing of said engine key switch for connecting said switching means to said predetermined load to instruct said wireless transmitting means to transmit said first signal, then connecting said switching means to a power line to instruct said wireless transmitting means to transmit said second signal in response to the opening of said engine key switch.

4. A telephone apparatus according to claim 3, wherein said pad means includes horn switching means a horn switch for connecting said input terminal of said voltage regulating circuit to a certain load; a horn driver for energizing a horn incorporated of a vehicle including resistor means connected between said power line and said switching means and horn switch means responsive to a voltage drop below a predetermined value of said resistor means for energizing said horn.

5. A telephone apparatus comprising:
a telephone set including a handset mouthpiece, a handset earpiece, handset wireless transmitter connected to said handset mouthpiece, a handset wireless receiver connected to said handset earpiece, signal identifying means for discriminating signals received by said handset receiver, said signal identifying means arranged to generate a first power-on signal at the time of identification of a first signal and to erase said first power-on signal at the time of identification of a second signal, a telephone set power supply circuit having secondary battery means and switch circuits arranged to apply the voltage of said secondary battery means to each of said elements during the period in which one of said first power-on signal and a second power-on signal are provided, a power receiving connection member connected to said secondary battery means, and a telephone set power supply controlling means disposed between said secondary battery means and said power receiving connection member for detecting power supplied from said secondary battery means toward said power receiving connection members, said telephone set power supply controlling means arranged to generate said second power-on signal when said power is detected;

pad means arranged at the center of a steering wheel of a vehicle by means of a floating mechanism in a stationary state irrespective of the rotation of said wheel, said pad means providing support for said telephone set;

a voltage regulating circuit disposed in said said pad means and including a power supply terminal which can be contacted by said power receiving connection member when said telephone set is placed in a predetermined location, and a diode having an input terminal and an output terminal connected to said power supply connection member, said diode inhibiting the direct flow of a current from said input terminal to said output terminal but permitting a flow reverse to said direct flow;

switching means connected to said input terminal of said voltage regulating circuit through a slip-ring connector of said floating mechanism for selectively connecting said input terminal to one of a predetermined load and a power line connected through an engine key switch to battery means incorporated in a vehicle;

signal generating means for transmitting said first and second signals;

a mobile radiotelephone parent set incorporated in said vehicle;

a wireless relay transmitter connected to said mobile telephone parent set for transmitting to said handset wireless receiver a signal received by said mobile radiotelephone parent set and a signal generated by said signal generating means;

a wireless relay receiver connected to said mobile telephone parent set for receiving a signal from said handset wireless transmitter to transmit said signal to said mobile telephone parent set; and telephone power supply control instructing means responsive to the closing of said engine key switch for connecting said switching means to said predetermined load to instruct said wireless transmitting means to transmit said first signal, then connecting said switching means to a power line to instruct said wireless transmitting means to transmit said second signal in response to the opening of said engine key switch.

6. A telephone apparatus according to claim 5, wherein said pad means includes horn switching means a horn switch for connecting said input terminal of said voltage regulating circuit to a certain load; a horn driver for energizing a horn incorporated of a vehicle including resistor means connected between said power line and said switching means and horn switch means responsive to a voltage drop below a predetermined value of said resistor means for energizing said horn.

* * * * *